(12) United States Patent
Rabinowitz et al.

(10) Patent No.: US 12,190,915 B2
(45) Date of Patent: Jan. 7, 2025

(54) COMMON TIMELINE PROCESSING FOR UNIQUE MANIFESTS

(71) Applicant: Synamedia Limited, Staines Upon Thames (GB)

(72) Inventors: Rourke Rabinowitz, Brookhaven, GA (US); Clint Earl Ricker, Teddington (GB); Samie Beheydt, Geluwe (BE); Kenneth James Penner, Peachtree Corners, GA (US); Chunfan Wu, Suwanee, GA (US)

(73) Assignee: SYNAMEDIA LIMITED, Maidenhead (GB)

(*) Notice: Subject to any disclaimer, the term of this patent is extended or adjusted under 35 U.S.C. 154(b) by 1 day.

(21) Appl. No.: 18/074,468

(22) Filed: Dec. 3, 2022

(65) Prior Publication Data

US 2024/0185891 A1 Jun. 6, 2024

(51) Int. Cl.
*H04N 21/262* (2011.01)
*G11B 27/10* (2006.01)
*H04N 21/231* (2011.01)
*H04N 21/235* (2011.01)
*H04N 21/239* (2011.01)
*H04N 21/274* (2011.01)
*H04N 21/845* (2011.01)
*H04N 21/858* (2011.01)

(52) U.S. Cl.
CPC ..... *G11B 27/102* (2013.01); *H04N 21/23106* (2013.01); *H04N 21/235* (2013.01); *H04N 21/2393* (2013.01); *H04N 21/274* (2013.01); *H04N 21/8456* (2013.01); *H04N 21/8586* (2013.01)

(58) Field of Classification Search
None
See application file for complete search history.

(56) References Cited

U.S. PATENT DOCUMENTS

| | | | |
|---|---|---|---|
| 9,794,604 B2 * | 10/2017 | Ohno | H04N 21/8456 |
| 10,237,334 B2 * | 3/2019 | Alexander | H04N 21/2365 |
| 10,284,888 B2 * | 5/2019 | Pantos | H04N 21/43072 |

(Continued)

OTHER PUBLICATIONS

1 Extended European Search Report dated Apr. 9, 2024, European Application No. 23210155.0, pp. 1-9.

*Primary Examiner* — An Son P Huynh
(74) *Attorney, Agent, or Firm* — Fernando & Partners, LLP

(57) ABSTRACT

Common timeline processing techniques for generating unique manifests are described herein. In accordance with various embodiments a method is performed at one or more servers that include one or more processors, one or more non-transitory memory, and one or more network interfaces. The method includes receiving a request from a client for a unique manifest, wherein the request indicates a recording timeline and includes a recording identifier (ID). The method further includes constructing the unique manifest in response to the request according to the recording timeline, including obtaining at least a portion of the unique manifest from a cache in accordance with determining a corresponding portion of the recording timeline exists in the cache. The method additionally includes appending the recording ID of the request to a URL prefix in the unique manifest. The method also includes sending the unique manifest to the client.

20 Claims, 10 Drawing Sheets

(56) References Cited

U.S. PATENT DOCUMENTS

| | | | |
|---|---|---|---|
| 10,313,721 B1* | 6/2019 | McLeod | H04N 21/8456 |
| 10,419,786 B1* | 9/2019 | Choi | H04N 21/8456 |
| 10,701,415 B2* | 6/2020 | Lee | H04N 21/84 |
| 10,708,331 B1* | 7/2020 | Joliveau | H04L 65/613 |
| 10,743,037 B1* | 8/2020 | Vantalon | H04N 21/23106 |
| 10,834,158 B1* | 11/2020 | Bourgoyne | H04N 21/4825 |
| 11,089,379 B2* | 8/2021 | Pantos | H04L 65/762 |
| 11,100,051 B1* | 8/2021 | Mao | G06F 16/137 |
| 11,133,037 B1* | 9/2021 | Kalish | G06F 16/745 |
| 11,146,847 B1* | 10/2021 | Harshawat | H04M 1/72406 |
| 11,463,745 B2* | 10/2022 | Okuyama | H04N 21/2343 |
| 11,509,949 B2* | 11/2022 | May, Jr. | H04N 21/64322 |
| 11,627,357 B2* | 4/2023 | Lu | H04N 21/2743 725/32 |
| 2005/0021822 A1* | 1/2005 | Cherkasova | H04L 65/80 709/231 |
| 2012/0047542 A1* | 2/2012 | Lewis | H04N 21/44016 725/97 |
| 2014/0150019 A1* | 5/2014 | Ma | H04N 21/458 725/34 |
| 2014/0229976 A1* | 8/2014 | Ma | H04N 21/26258 725/87 |
| 2014/0230003 A1* | 8/2014 | Ma | H04N 21/4147 725/115 |
| 2014/0270717 A1* | 9/2014 | Chen | H04N 21/4334 386/299 |
| 2014/0379871 A1* | 12/2014 | Van Brandenburg | H04L 65/613 709/219 |
| 2017/0289639 A1* | 10/2017 | Reisner | H04L 67/06 |
| 2017/0339437 A1* | 11/2017 | Lee | H04N 21/2383 |
| 2018/0063580 A1* | 3/2018 | Wittke | G06F 16/71 |
| 2018/0137208 A1 | 5/2018 | Ricker et al. | |
| 2018/0302452 A1* | 10/2018 | Pantos | H04L 67/02 |
| 2019/0116101 A1* | 4/2019 | Harb | H04L 41/50 |
| 2020/0221063 A1* | 7/2020 | Kammachi Sreedhar | H04N 21/85406 |
| 2021/0368221 A1* | 11/2021 | Loheide | H04N 21/812 |
| 2022/0343328 A1* | 10/2022 | Fowler | G06Q 30/0631 |
| 2023/0113594 A1* | 4/2023 | Tamir | H04L 67/563 726/1 |

* cited by examiner

COMMON TIMELINE PROCESSING FOR UNIQUE MANIFESTS

TECHNICAL FIELD

The present disclosure relates generally to media content recording and playback, and in particular, to systems, devices, and methods of using common timeline processing to construct unique manifests.

BACKGROUND

Many unique recording systems store a unique database record and a unique copy of the content for each recording. When clients request playback, such unique recording systems retrieve records from the database related to the recording's manifest in order to provide the recording. In such systems, unique manifests cannot be reused between separate clients.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1B:
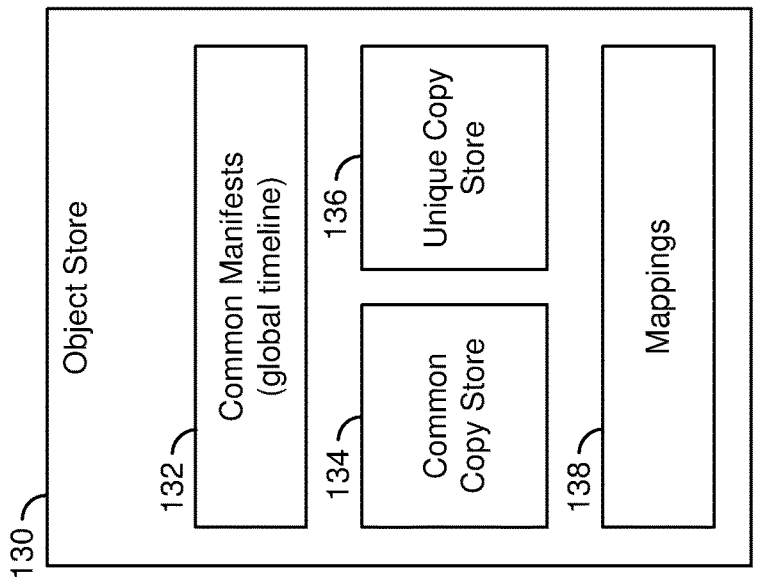
FIG. 1B is a block diagram of an object store in the exemplary storage system in accordance with some embodiments.

In accordance with common practice various features shown in the drawings may not be drawn to scale, as the dimensions of various features may be arbitrarily expanded or reduced for clarity. Moreover, the drawings may not depict all of the aspects and/or variants of a given system, method or apparatus admitted by the specification. Finally, like reference numerals are used to denote like features throughout the figures.

DESCRIPTION OF EXAMPLE EMBODIMENTS

Numerous details are described herein in order to provide a thorough understanding of the illustrative implementations shown in the accompanying drawings. However, the accompanying drawings merely show some example aspects of the present disclosure and are therefore not to be considered limiting. Those of ordinary skill in the art will appreciate from the present disclosure that other effective aspects and/or variants do not include all of the specific details of the example implementations described herein. While pertinent features are shown and described, those of ordinary skill in the art will appreciate from the present disclosure that various other features, including well-known systems, methods, components, devices, and circuits, have not been illustrated or described in exhaustive detail for the sake of brevity and so as not to obscure more pertinent aspects of the example implementations disclosed herein.

Overview

Methods, devices, and systems described herein store recording data according to global timelines. For unique recordings, when returning a unique manifest, a URL prefix (e.g., the value of the @BaseURL attribute) is changed to include the recording identifier (ID). This allows a client to use the URL prefix as part of subsequent segment requests in order to return specific segments recorded for the client. Such a method enables generating unique manifests efficiently for playback without an expensive database, thus lowering the cost of media content delivery.

In accordance with some embodiments, a method is performed at one or more servers including one or more processors, one or more non-transitory memory, and one or more network interfaces. The method includes receiving a request from a client for a unique manifest, wherein the request indicates a recording timeline and includes a recording identifier (ID). The method further includes constructing the unique manifest in response to the request according to the recording timeline, including obtaining at least a portion of the unique manifest from a cache in accordance with determining a corresponding portion of the recording timeline exists in the cache. The method additionally includes appending the recording ID of the request to a URL prefix in the unique manifest. The method also includes sending the unique manifest to the client.

Example Embodiments

Methods, devices, and systems described herein address the aforementioned challenges of generating unique manifests on the fly for unique recordings in cloud-enabled/network-based digital video recording (cDVR) systems. In some embodiments, a unique manifest is calculated for a given start and end time and then served to the requester where a URL prefix in the unique manifest is modified to allow the client to get their unique segments. In some embodiments, both static and dynamic manifests are cached and then served to clients with little changes to each manifest. While the uniquely generated manifest allows unique content to be served to the client, the system also caches the unique manifest for possible reuse. By using global timelines (also referred to hereinafter as "common timelines") but having unique URL prefixes based on each request, it is unnecessary to keep track of recording identifiers (IDs) in databases. Instead, the system described herein sets the recording ID into the URL prefix to enable future segment requests using the recording ID as part of the segment requests to look up the segment based off the recording ID. As such, common timeline processing for unique manifests is a way to share manifest metadata across multiple clients without performing computationally expensive tasks such as maintaining databases and/or making database calls.

Figure 1A:
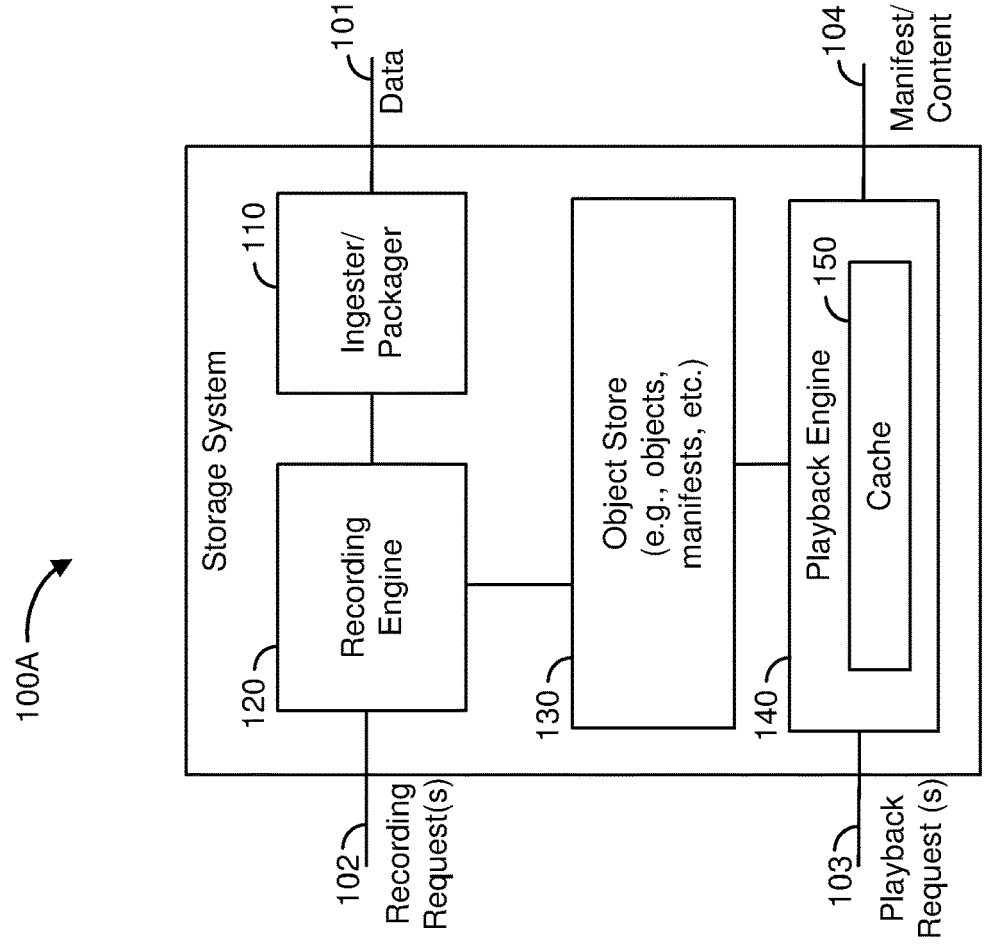
FIG. 1A is a block diagram of an exemplary storage system for media content recording and playback in accordance with some embodiments.

FIG. 1A is a block diagram of a storage system 100A for media content in accordance with some embodiments. While certain specific features are illustrated, those of ordinary skill in the art will appreciate from the present disclosure that various other features have not been illustrated for the sake of brevity and so as not to obscure more pertinent aspects of the example implementations disclosed herein. To that end, in some embodiments, the storage system 100A is used in cDVR to facilitate media content recording and playback. A cDVR system often stores media content as media objects corresponding to a recording (e.g., an episode of a television show). In some embodiments, a media object includes a number of media segments. In order to manage (e.g., record and playback, etc.) the media segments, as will be described in further detail below, the storage system 100*a* associates the media segments with metadata and/or manifests that describe the media objects.

To record the media content, in some embodiments, the storage system 100A includes an ingester and/or packager 110, a recording engine 120, an object store 130, and a playback engine 140. In some embodiments, the ingester and/or packager 110 receives media data 101, encodes the media data 101, and/or packages the media data 101. In some embodiments, the recording engine 120 receives recording request(s) 102, generates the stream metadata for each stream, and instructs the object store 130 to store the media data 101 as media contents and store the metadata associated with the recording. e.g., storing the media segments and the metadata as a set of manifest files describing the segments available over a range of time. In some embodiments, the recording engine 120 includes multiple instances and each is responsible for recording a source (e.g., a channel).

In some embodiments, the recording engine 120 (or an instance of the recording engine 120), on start of recording according to the recording request(s) 102, reads back the recording timeline to discover the recorder tip and then polls the manifest data from the ingester and/or packager 110 for newly received media data 101. In the case of not finding an existing timeline stored in the object store 130, the recording engine 120 obtains the manifest data from the ingester and/or packager 110 as is, uses such manifest data as the first timeline, and extends the timeline as new content becomes available, e.g., new elements such as video representations, audio, subtitles, periods, etc. In some embodiments, such manifest data with the timeline is recorded in a Media Presentation Description (MPD) for a respective source that describes the segment timeline, e.g., sequentially with segment identifiers of segment sequences. In such embodiments, the MPD is written to the object store 130 as an object and periodically re-written to describe the latest segment timeline in accordance with some embodiments.

Though FIG. 1A illustrates the ingester and/or packager 110 as part of the storage system 100A, in some embodiments, the ingester and/or packager 110 is external to the storage system 100A. In such embodiments, the recording engine 120 copies the media objects from the ingester and/or packager 110 to the object store 130 when obtaining the manifest data from the ingester and/or packager 110. When merging the manifest data from the ingester and/or packager 110 to the timeline, in the case of the timeline exceeding a predefined (and possibly configurable) duration and/or size, the recording engine 120 chunks the timeline and writes the additional metadata to a new timeline chunk. In some embodiments, the object store 130 stores the media objects and/or the metadata for a configured window of time. At the expiration of the time window, the object store deletes the media objects and/or the metadata.

At playback time, in some embodiments, the playback engine 140 receives playback request(s) 103 to playback (e.g., obtain or retrieve) the media objects from the object store 130. In some embodiments, the playback engine 140 handles playback requests via HTTP against a recording identifier (ID) associated with a recording and a requested recording timeline, e.g., a start time and an end time of the recording. In some embodiments, the recording ID is a universally unique identifier (UUID) and includes a user ID, a device ID, an account number, and/or a combination of various identifiers. Based on the requested recording and the recording start and end time, in some embodiments, the playback engine 140 retrieves the timeline chunks from the object store 130 that cover the superset of the requested time window, concatenates them into a single timeline, and trims to the specifics of the request.

In some embodiments, as will be described in further detail below, when constructing the unique manifest for the client, the playback engine 140 specifies a URL prefix that includes the unique recording ID in the manifest. As such, when the playback engine 140 sends the manifest and subsequently the media content 104 to the client, the URL prefix is used by the client in segment requests, e.g., via HTTP calls, and the playback engine 140 can use the recording ID in the URL prefix in conjunction with segment IDs to obtain the media objects from the object store 130. In some embodiments, the playback engine 140 also includes a cache 150 for storing the unique manifests in response to client requests. When clients request a unique manifest with a similar recording timeline, the stored manifests in the cache 150 can be reused to shorten the response time. Similar to the manifest caching in the object store 130, in some embodiments, the manifests in the cache 150 are stored for a window of time, e.g., configurable. At the expiration of the window, the manifests are deleted from the cache 150.

FIG. 1B is a diagram 100B illustrating an embodiment of the object store 130 (FIG. 1A). In some embodiments, the object store 420 includes a common copy store 134 and a unique copy store 136. The common copy store 134 stores, among other things, common copies of different media objects, e.g., different episodes of a television show or different television shows that are shared between requesting clients. For example, a particular common copy of a media object (or a portion of a media object) corresponds to a sports program requested to be recorded by multiple subscribers. The unique copy store 136 stores a unique copy of media objects for a requesting user, e.g., according to requirements imposed by copyright law.

In some embodiments, the object store 130 also includes a common manifests store 132, e.g., common metadata such as sequencing information and/or a global timeline (also referred to hereinafter as "a common timeline"), and mappings 138, e.g., distinguishing metadata for the unique media objects in the unique copy store 136 and/or subscriptions of different recordings to the common copy media objects, etc. As such, the object store 130 utilizes the manifests in the common manifests store 132 and/or the mappings 138 for retrieving media objects stored in the common copy store 134 and/or the unique copy store 136 in response to playback requests.

In some embodiments, when a client requests a new manifest, as will be described in further detail below, the playback engine 140 (FIG. 1A) utilizes the global timeline from the common manifests store 132 to construct a unique manifest for the playback in response to the manifest request. In some embodiments, the segment metadata stored in the common manifests 132 are sequenced and each common manifest has a predefined duration. The common manifests 132 are thus arranged along the global timeline, e.g., each common manifest is 1-hour long along a timeline starting from 8 am, 9 am, and 10 am, etc.

In some embodiments, when generating unique manifests for playback, as will be described in further detail below, based on the start and end time of a recording, the manifests in the common manifests store 132 within the start and end time are merged and chunked to the correct start and end time and the recording ID is added to the URL prefix in the unique manifest (e.g., appending to the value of the @BaseURL attribute) to return to the requesting user. As such, one common manifest for a predefined duration can be used for generating multiple unique manifests in response to multiple playback requests.

It should be noted that components are represented in the exemplary storage systems 100A and 100B for illustrative purposes. Other configurations can be used and/or included in the exemplary systems 100A and 100B. For example, the ingester and/packager 110 can be part of the exemplary system 100A or external to the storage system 100A. In another example, the cache 150 can be on a different server, e.g., on an edge device, or distributed, e.g., a part on the headend server, a part on the edge, and/or a part on the client device(s). In yet another example, the common manifests store 132, the common copy store 134, the unique copy store 136, and the mappings 138 can be on the same storage device or on separate storage devices. Further, the information in the common manifests store 132, the common store 134, the unique copy store 136, and the mappings 138 can be correlated and/or cross referenced, e.g., cross referencing the object IDs, the recording IDs, the timestamps, etc. As such, various features of implementations described herein with reference to FIGS. 1A and 1B can be embodied in a wide variety of forms, and that any specific structure and/or function described herein is illustrative.

Figure 2:
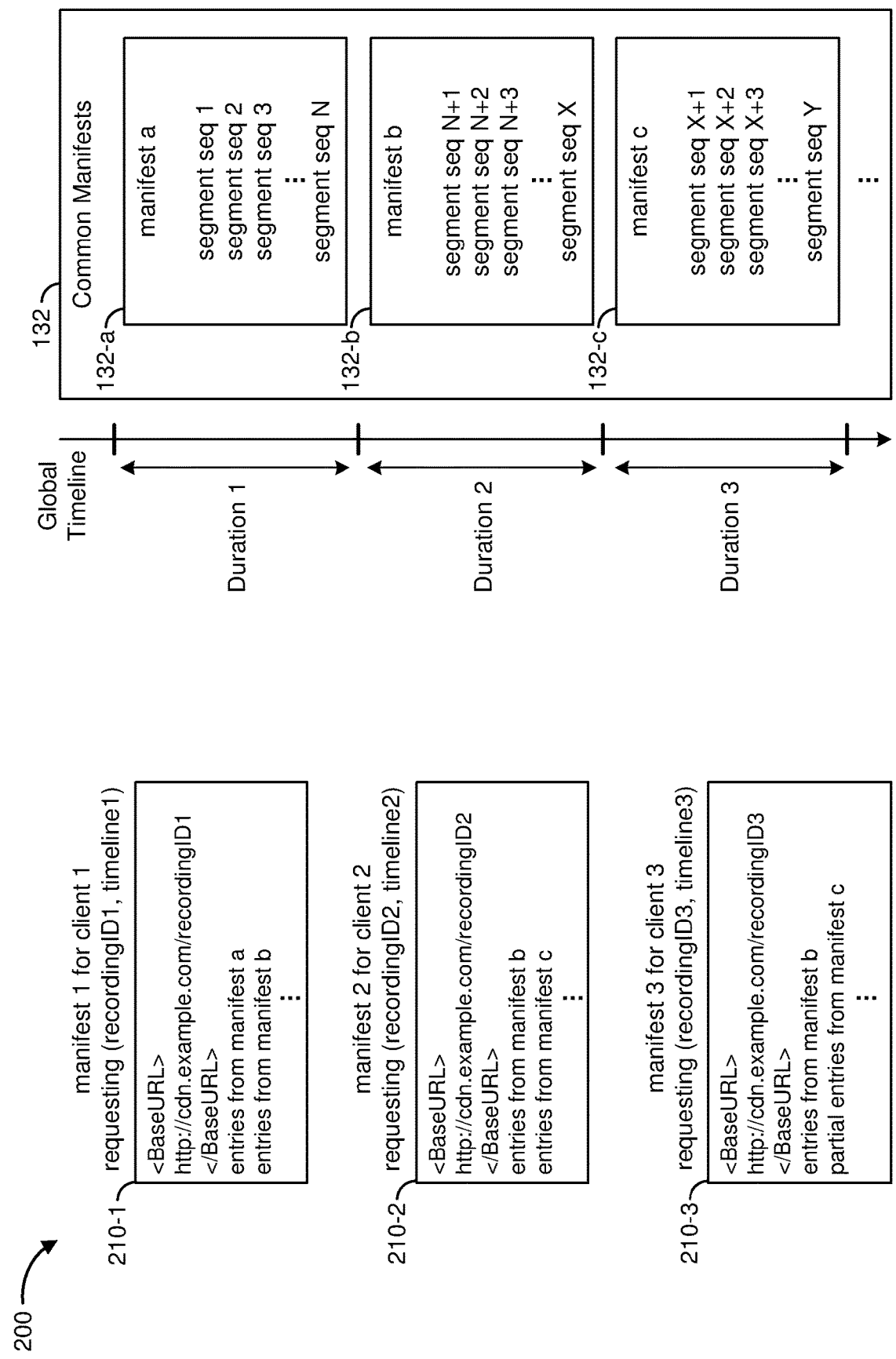
FIG. 2 is a diagram illustrating generating exemplary unique manifests based on a global timeline in accordance with some embodiments.

FIG. 2 is a diagram 200 illustrating generating exemplary unique manifests based on a global timeline in accordance with some embodiments. In the example shown in FIG. 2, the common manifests store 132 include manifest a 132-*a*, manifest b 132-*b*, and manifest c 132-*c*, etc. Each of the files in the common manifests store 132 includes sequencing information for a plurality of segments, e.g., information for segment sequence 1 through N in manifest a 132-*a*, information for segment sequence N+1 through X in manifest b 132-*b*, and information for segment sequence X+1 through Y in manifest c 132-*c*, etc. Further, each of the common manifests 132 is generated according to a predefined duration, e.g., 1-hr, along the global timeline, e.g., manifest a 132-*a* for duration 1, manifest b 132-*b* for duration 2, and manifest c 132-*c* for duration 3, etc.

For example, the sequencing information in the common manifests store 132 can include temporal information associated with a media object. In some embodiments, the temporal information includes a temporal range (e.g., length or duration of recording) and/or a start time value and end time value. In another example, the sequencing information includes a segment ID (e.g., a presentation time stamp (PTS)) associated with a sequential media segment in a media content item, e.g., the chronological first segment of a television program such as the opening credits. In some embodiments, the temporal information can indicate the time span of the recording in a variety of ways and/or indicate one or more standard programming slots, e.g., 8:00 pm to 8:30 pm and 8:30 pm to 9:00 pm, etc. In yet another example, a respective common manifest in the common manifest store 132 includes a source identifier that identifies a source associated with the media object, such as a particular television channel, a broadcast channel, or a sub-channel (also referred to as profiles) with multiple versions, bitrates, video resolutions, audio, and/or subtitles.

In some embodiments, the timeline format is the same as the source format, e.g., the timeline in HTTP Live Streaming (HLS) format when the source is an HLS source or the timeline in Dynamic Adaptive Streaming over HTTP (DASH) format when the source is a DASH source. In some embodiments, when the timeline is in DASH format, the global timeline is encoded as MPD metadata as shown in FIG. 2 in per-source and predefined duration (e.g., manifest a 132-*a*, manifest b 132-*b*, and manifest c 132-*c* are per-hour chunks). The same general design patterns shown in FIG. 2 can be applied to HLS or other formats.

In some embodiments, the initial timeline object is the MPD from the ingester and/or packager 110 (FIG. 1A) and includes elements from the MPD. As additional updates are added to the stream (e.g., new media content elements in the media data 101, FIG. 1A), the additions to the manifest in the ingester and/or packager are appended and/or merged into the timeline MPD. As such, the timeline format inherits functionalities from the upstream ingester and/or packager 110, e.g., splice opportunities, etc., and allows such functionalities to flow through.

When client 1 requests a new manifest for a recording with recording ID 1 and recording timeline 1, the playback engine 140 (FIG. 1A) receives such a playback request and uses the global timeline to locate manifest a 132-*a* and manifest b 132-*b* that correspond to the start and end time of recording timeline 1. Further, the playback engine merges entries from manifest a 132-*a* and manifest b 132-*b* to manifest 1 210-1. Moreover, the playback engine specifies in manifest 1 210-1 the unique recording ID 1 as part of the prefix to the URL, e.g., including recording ID 1 in the value of the @BaseURL attribute. The playback engine then returns manifest 1 210-1 to client 1 in order for the handle playback and the acquisition of segment data by client 1, e.g., returning segments related to the specific recording corresponding to recording ID 1 and recording timeline 1.

Likewise, when client 2 requests a new manifest for a recording with recording ID 2 and recording timeline 2, the playback engine constructs unique manifest 2 210-2 using manifest b 132-*b* and manifest c 132-*c* that correspond to the start and end time of recording timeline 2 and specifies in manifest 2 210-2 the unique recording ID 2 as part of the prefix to the URL, e.g., including recording ID 2 in the value of the @BaseURL attribute. The playback engine then returns manifest 2 210-1 to client 2 in order to handle playback and the acquisition of segment data by client 2, e.g., returning segments related to the specific recording corresponding to recording ID 2 and recording timeline 2.

In some embodiments, in addition to merging the entries, the playback engine also trims the timeline to the start and end time of the recording line 1. For example, when client 3 requests a new manifest for a recording with recording ID 3 and recording timeline 3, the playback engine constructs unique manifest 3 210-3 using manifest b 132-*b* that correspond to the start and end time of recording timeline 3. In addition, the playback engine chunks manifest c 132-*c* to recording timeline 3, so that a subset of entries from manifest c 132-*c* is included in manifest 3 210-3. For example, in the case of manifest c 132-*c* corresponds to 9 am to 10 am along the global timeline and the recording timeline 3 specifies 9:12 am as the end time, the playback engine chunks manifest c 132-*c* so that a subset of entries in manifest c 132-*c* corresponding to 9 am to 9:12 am is included in manifest 3 210-3.

As shown in FIG. 2, manifest data is stored globally along the global timeline. The common manifest data eliminates the need for storing separate manifests on a per recording basis. Accordingly, relative to previously existing systems that rely on a database for tracking unique manifests, using a global timeline and common manifests reduces the storage requirement for providing unique manifests. Further, database calls are generally expensive. Thus, eliminating database calls to retrieve the manifest data lowers the cost associated with unique manifest generation.

Figure 3A:
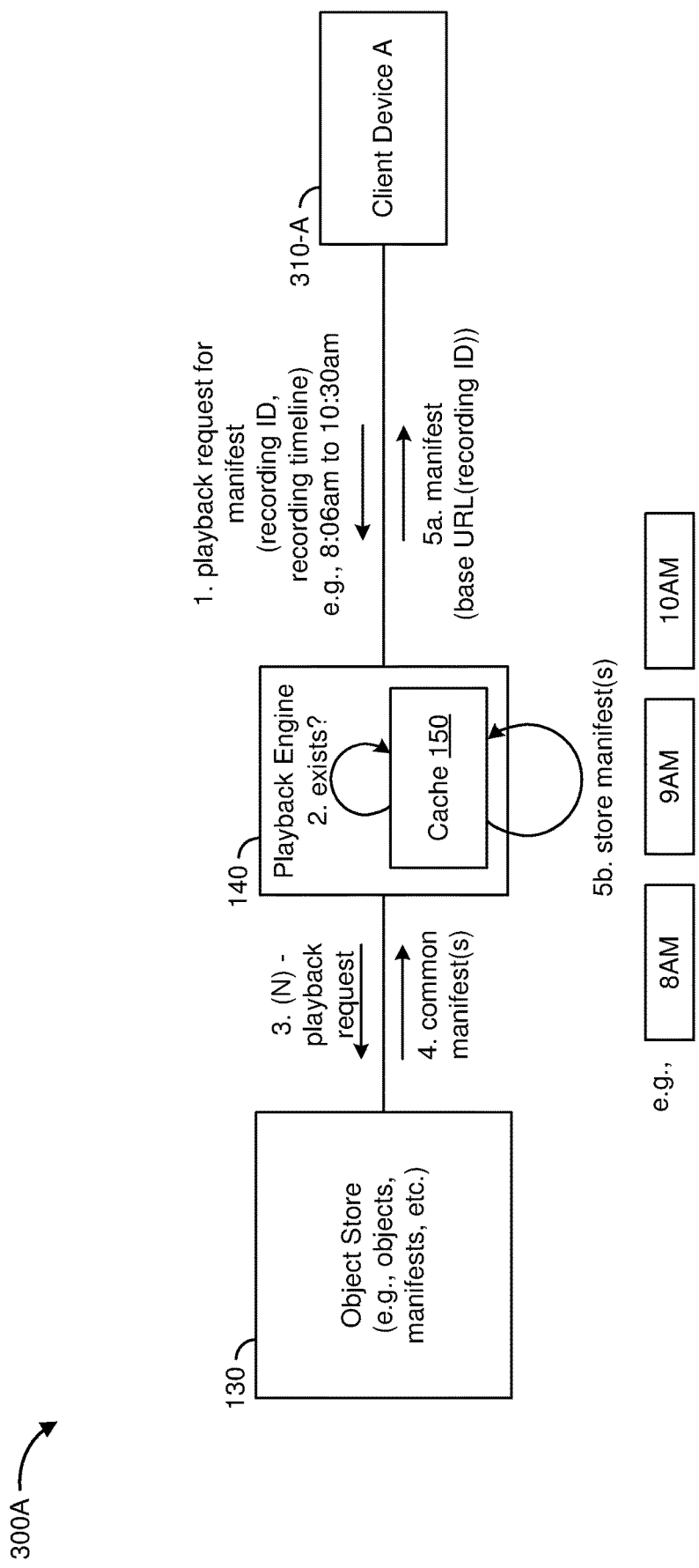
FIGS. 3A-3C are diagrams illustrating requesting and obtaining unique manifests from the exemplary storage systems with common timeline processing in accordance with some embodiments.
Figure 3B:
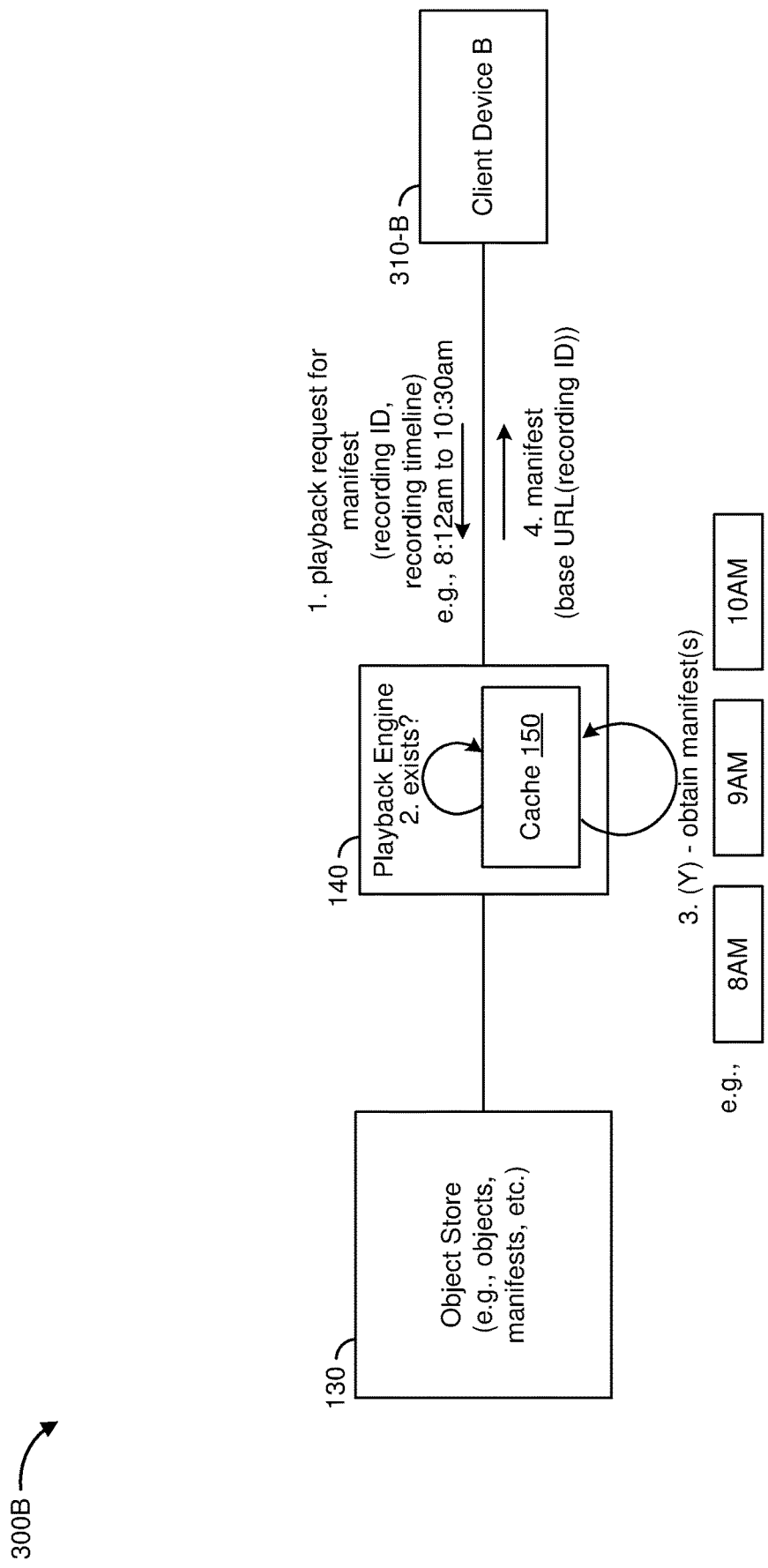
Figure 3C:
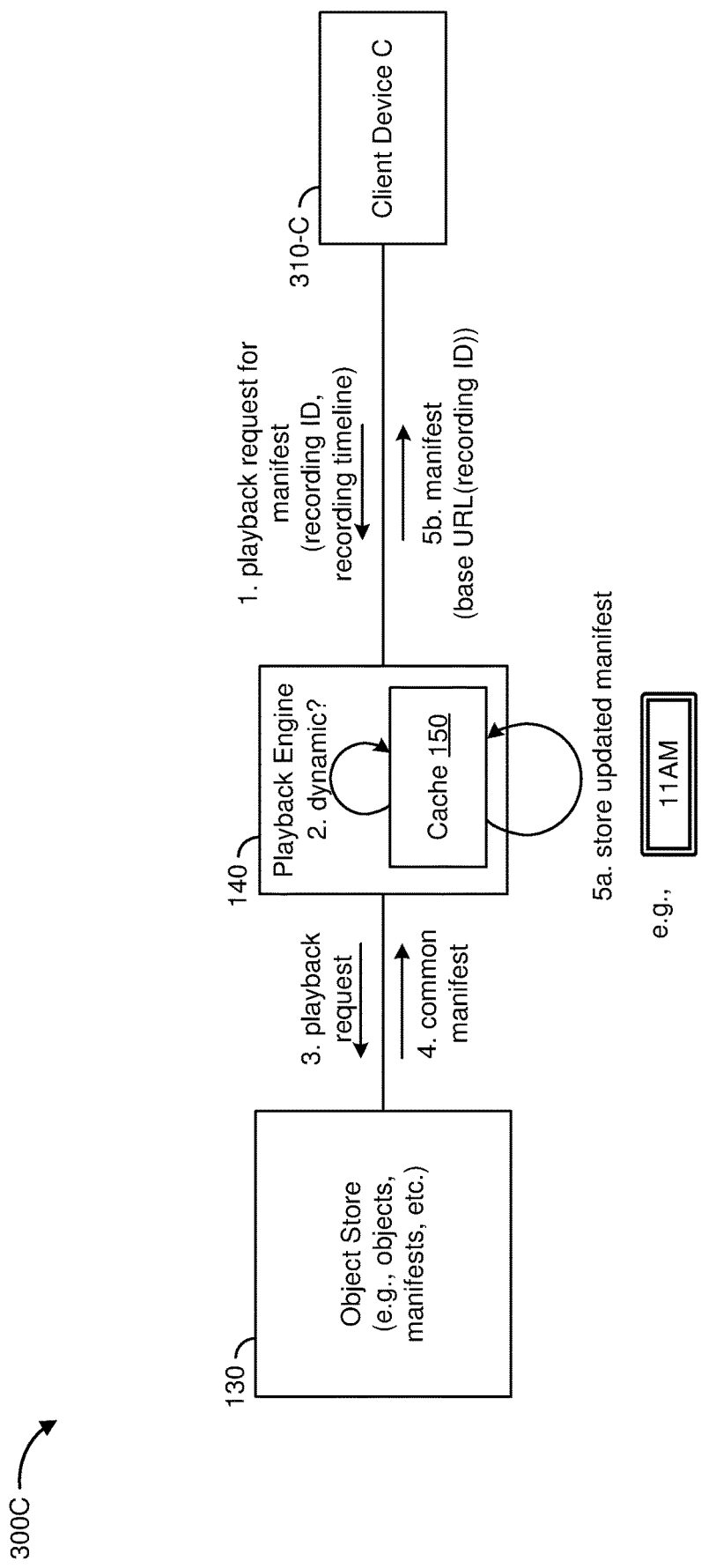

FIGS. 3A-3C are diagrams 300A-300C illustrating requesting and obtaining unique manifests from the exemplary systems described herein with common timeline processing in accordance with some embodiments. In some embodiments, as shown in step 1 of FIG. 3A, a client at client device A 310-A requests a new manifest for the playback and specifies in the manifest request the recording ID and the recording timeline. In step 2, the playback engine 140 determines whether the requested recording timeline is already in the cache 150 in accordance with some embodiments. In step 3, having determined that the requested recording timeline does not exist in the cache 150 ("No"-branch from step 2), the playback engine 140 sends the playback request to the object store 130 to obtain the common manifest(s) corresponding to the requested recording timeline in step 4.

For example, in the case of the requested recording timeline specifies the start time at 8:06 am and the end time at 10:30 am, the playback engine 140 obtains four common manifests corresponding to the duration starting from 8 am, 9 am, and 10 am and each with one hour duration. In some embodiments, as described above, the playback engine 140 merges the common manifests obtained from the object store 130 and chunks the manifest to the start and end time of the requested recording timeline, e.g., trimming the manifest to include entries from 8:06 am to 10:30 am. Further, as described above, the playback engine 140 specifies in the unique manifest the recording ID as part of the prefix, and sends the unique manifest to client device A 310-A in step 5a.

In some embodiments, in step 5b, the playback engine 140 further caches the manifest in the cache 150. In some embodiments, in the case of the requested recording end time being after the current time, the playback engine 140 determines that the client is requesting dynamic content, e.g., live streaming, and the playback engine 140 saves the manifest as individual predefined duration manifest(s) (e.g., each an hour long) and stores the manifest file(s) in the cache 150. In some embodiments, in the case of the requested recording end time not being after the current time, the playback engine 140 determines that the client is requesting static content, e.g., video-on-demand (VOD) content, and the playback engine 140 saves the predefined duration manifest(s) for a configurable time period to be utilized by other playback requests as will be shown and described with reference to FIG. 3B. In some embodiments, the configurable time period that the manifest(s) remain in the cache 150 depends on factors such as the frequency of the reuse and/or how long a particular manifest has been cached, etc.

In FIG. 3B, similar to step 1 in FIG. 3A, a client at client device B 310-B requests a new manifest for the playback and specifies in the manifest request the recording ID and the recording timeline in step 1. Also similar to step 2 in FIG. 3A, in step 2 of FIG. 3B, the playback engine 140 determines whether the requested recording timeline is already in the cache 150 in accordance with some embodiments. Different from the example shown in FIG. 3A, in step 3 of FIG. 3B, having determined that at least a portion of the requested recording timeline exists in the cache 150 ("Yes"-branch from step 2), the playback engine 140 utilizes the cached manifest(s) corresponding to the requested recording timeline to construct the unique manifest in step 3 before sending the unique manifest with the recording ID specified in the URL prefix to client device B 310-B in step 4. In some embodiments, similar to the example described with reference to FIG. 3A, the playback engine 140 merges the manifests obtained from the cache 150 and chunks the manifest to the start and end time of the requested recording timeline. For example, in the case of the requested recording timeline being from 8:12 am to 10:30 am, e.g., skipping the beginning part of the recording, the playback engine 140 utilizes the cached manifests starting from 8 am, 9 am, and 10 am and trimming the manifest starting from 8 am to the start time 8:12 am.

In FIG. 3C, in response to a client at client device C 310-B requesting a new manifest in step 1, the playback engine 140 determines whether the requested recording timeline is already in the cache 150 in accordance with some embodiments. In addition, in step 2, the playback engine 140 determines whether the client has requested dynamic content, e.g., the recording timeline end time is after the current time. As described above, for dynamic content, the objects and manifests for the current hour are still being updated in the object store 130. Accordingly, the playback engine 140 checks the object store 130 for the current hour manifest when preparing the unique manifest in case it has been updated, and in step 4, obtains the up-to-date current hour manifest. Having obtained the current hour manifest, in step 5a, the playback engine 140 stores the updated manifest in the cache 150 and constructs the unique manifest using the up-to-date manifest, including specifying in the manifest the recording ID as part of the URL prefix.

As shown in FIGS. 3A-3C, using the common timeline processing for constructing unique manifests, no expensive database calls are necessary to look up manifest data. Accordingly, relative to previously existing systems that rely on a database for tracking unique manifests and use a separate database call to retrieve the manifest data for each recording, the methods, devices, and systems described herein are more efficient and consume less computational resources. Also as shown in FIGS. 3A-3C, manifest data can be cached, whether the cache 150 is located within the playback engine 140, e.g., in the application, in between the object store 130 and the playback engine 140, or even partially on the client device, fewer storage calls are made to the object store 130. For example, in the example shown in FIG. 3B, the playback engine 140 can use the cached manifest data to provide the unique manifest to client device B 310-B without inquiring the object store 130. As a result, the systems described herein in accordance with various embodiments reduce the signaling between the object store 130 and the playback engine 140. In particular, in a system that receives many manifest requests having the same or overlapping times in their start and end time, common timeline processing for unique manifests performs better without wasted resources for generating each individual manifest when they are mostly the same, e.g., majority of the segments listed in the manifests are the same.

Figure 4:
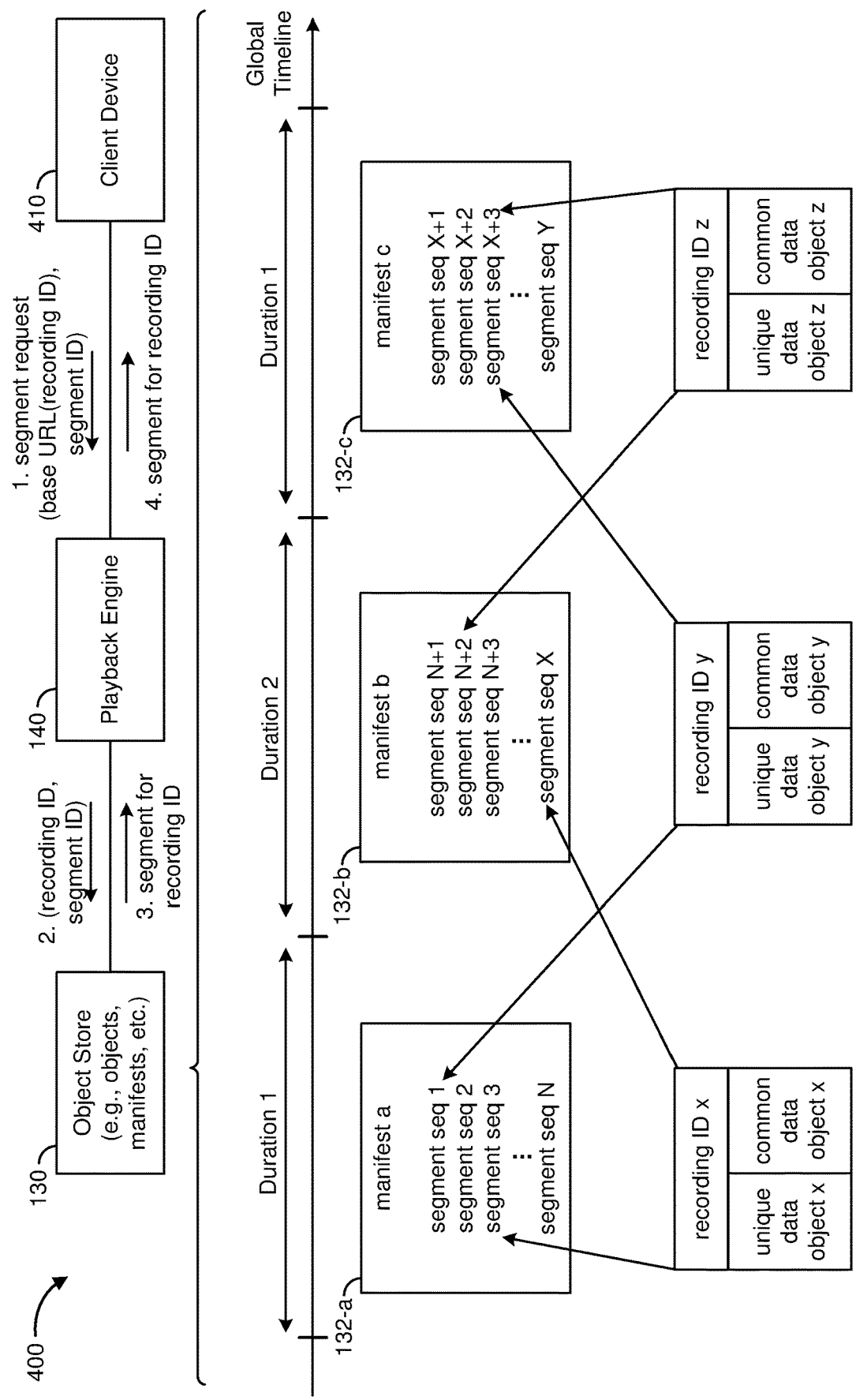
FIG. 4 is a diagram illustrating obtaining segment data based on a unique manifest generated using common timeline processing in accordance with some embodiments.

FIG. 4 is a diagram 400 illustrating obtaining segment data based on a unique manifest generated using common timeline processing in accordance with some embodiments. As described above with reference to FIG. 1B, when storing the media data into the object store 130, the recording engine 120 records metadata and/or mappings, such as the source of the segment, the segment ID, an array of recording IDs, and the segment sequencing information. In some embodiments, the object store 130 maintains the mapping such as from segment ID to logical byte offset in the media object of the recording's concatenated segments. The storage system is responsible for supporting the retrieval of the mapping of a recording's segment identifier to logical byte offset for the recording's concatenated segments. This allows for the movement of (parts of) a recording to another storage tier or storage system.

Also as described above with reference to FIGS. 1A and 2, in some embodiments, the recording engine generates an MPD for a source at recording time and the playback engine retrieves the MPD at playback time to generate unique manifests, which include unique recording IDs as part of URL prefixes. Using the unique manifests, the playback engine can retrieve segments from the object store 130 using the recording ID, which includes the source ID in some embodiments, and the recording timeline, e.g., the start and end time, in accordance with some embodiments.

Additionally, as described above with reference to FIG. 1B, in some embodiments, the object store 130 stores both common copy media objects and unique copy media objects. During playback time, in some embodiments, the playback engine retrieves a unique copy media object using the recording ID and the segment ID, retrieves a common copy media object using the source ID and the segment ID, and merges the unique copy media object with the common copy media object to generate the segment for the playback. In such embodiments, the object store 130 also tracks interests to the common copy media objects so that when using the mappings and/or the metadata stored in the object store 130, the media objects can be located for each recording.

For example, in FIG. 4, using the example shown in FIG. 2, during recording time, the recording engine generates the common manifests 132-*a*, 132-*b*, and 132-*c* and stores them in the object store 130 along with media objects for various recordings, e.g., for one recording associated with recording ID x, for another recording associated with recording ID y, and for yet another recording associated with recording ID z. The object store 130 tracks mappings between segment sequences and recording IDs. For instance, in FIG. 4, recording ID x is mapped to a recording that starts from segment sequence 3 specified in manifest a 132-*a* and ends at segment sequence X specified in manifest b 132-*b*, where the recording includes unique data object x and common data object x. In another example, recording ID y is mapped to a recording that starts from segment 1 specified in manifest a 132-*a* and ends at segment sequence X+3 specified in manifest c 132-*c*, where the recording includes unique data object y and common data object y. In yet another example, recording ID z is mapped to a recording that starts from segment N+2 specified in manifest b 132-*b* and ends at segment sequence X+3 specified in manifest c 132-*c*, where the recording includes unique data object z and common data object z.

When a client device 410 sends to the playback engine 140 a segment request in step 1 of FIG. 4, the client device 410 uses the URL obtained from the unique manifest provided by the playback engine 140, which specifies a URL prefix that includes the recording ID, e.g., as part of the value of the @BaseURL attribute. As such, the segment request includes not only the segment ID, but also the recording ID, which further includes the source ID in some embodiments. In step 2, the playback engine 140 uses the information derived from the segment request to request the segment from the object store 130, e.g., the segment ID, the recording ID, and/or the source ID. In response to the request, the object store 130 uses the mappings and/or the metadata described above to retrieve the unique data object based on the recording ID and the segment ID and retrieve the common data object based on the source ID and the segment ID in accordance with some embodiments, merges the data objects to generate the segment data, and sends the requested segment for the recording to the playback engine 140 in step 3. The playback engine 140 then sends the segment for the recording to the client device 410 in step 4.

Figure 5A:
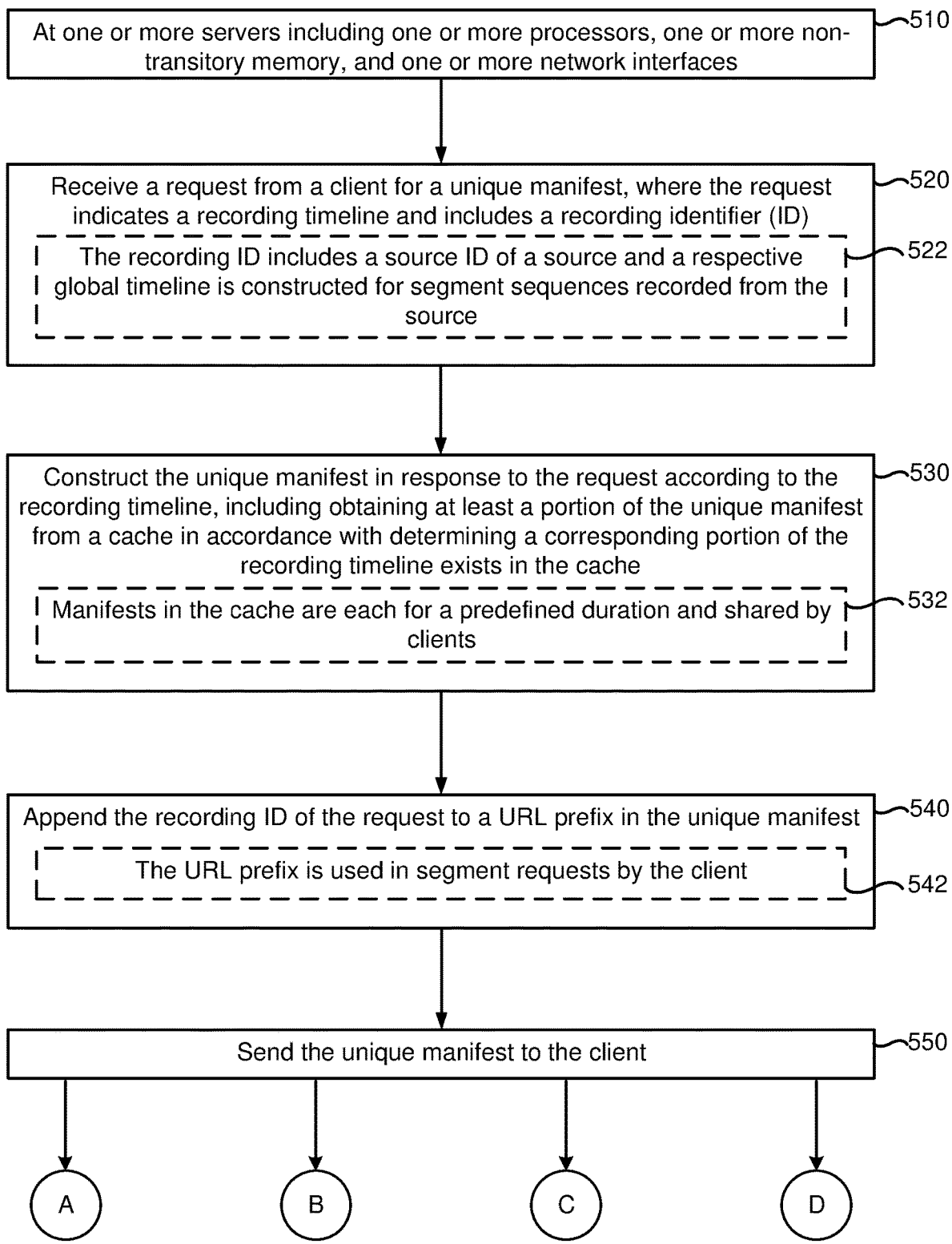
FIGS. 5A-5C are flowcharts illustrating a common timeline processing method for generating unique manifests in accordance with some embodiments.
Figure 5B:
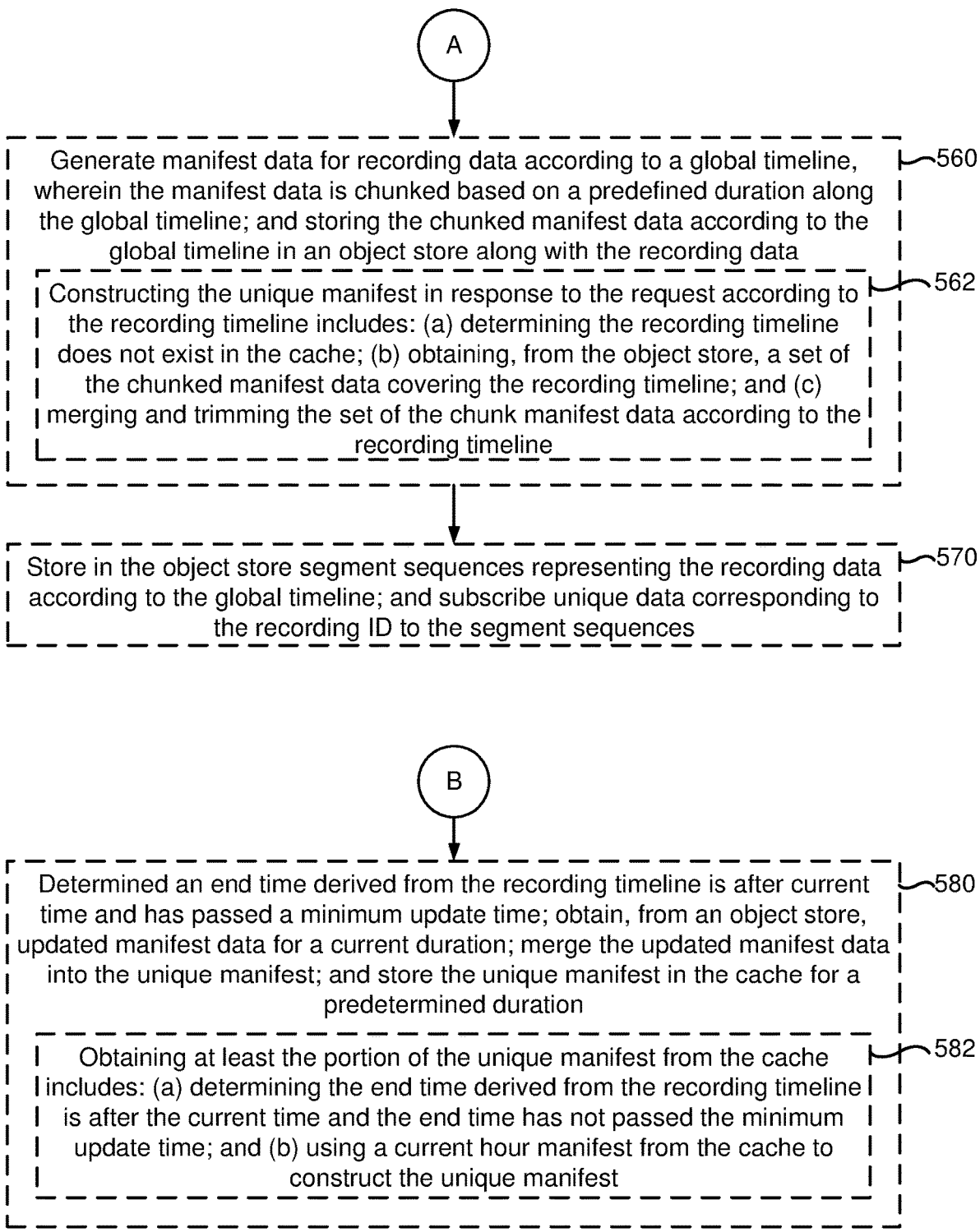
Figure 5C:
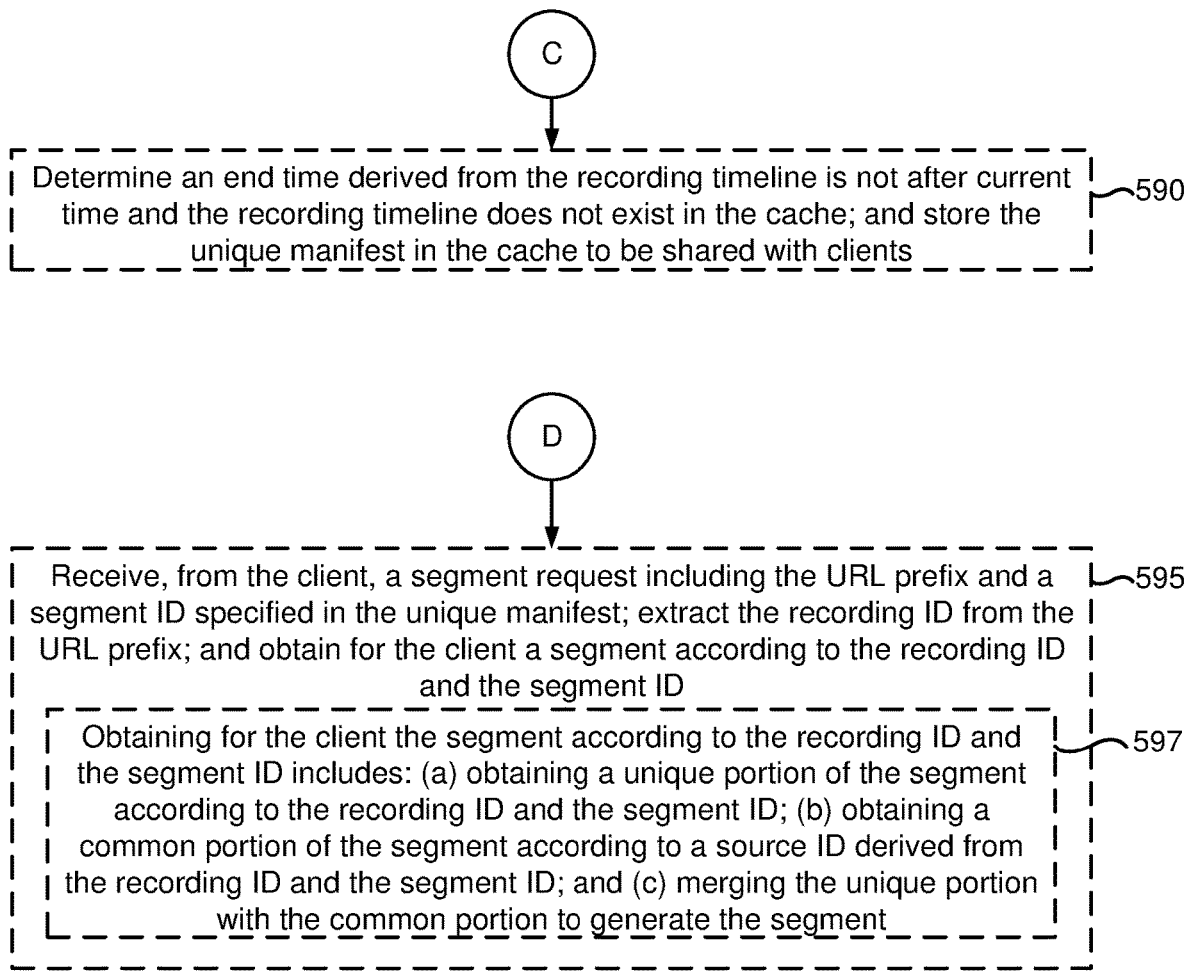

FIGS. 5A-5C are flowcharts illustrating a common timeline processing method 500 for generating unique manifests in accordance with some embodiments. In some embodiments, as represented by block 510, the method 500 is performed at one or more servers (e.g., a headend) hosting the storage system 100A in FIG. 1A, which include one or more processors, one or more non-transitory memory, and one or more network interfaces. The method 500 begins, as represented by block 520, with the one or more servers, e.g., the playback engine 140 in FIGS. 1A and 3A-3C, receiving a request from a client for a unique manifest, where the request indicates a recording timeline and includes a recording identifier (ID). For example, in step 1 shown in FIGS. 3A-3C, each of the client devices 310-A, 310-B, and 310-C sends a playback request for a unique manifest and specifies the recording ID and the recording timeline in the manifest request. In some embodiments, as represented by block 522, the recording ID includes a source ID of a source, e.g., a channel identifier, and a respective global timeline is constructed for segment sequences recorded from the source.

The method 500 continues, as represented by block 530, with the one or more servers, e.g., the playback engine 140 in FIG. 1A, constructing the unique manifest in response to the request according to the recording timeline, including obtaining at least a portion of the unique manifest from a cache in accordance with determining a corresponding portion of the recording timeline exists in the cache. For example, in FIG. 3B, the playback engine 140 determines that the three manifests stored in the cache 150 cover the requested recording timeline, obtains the cached manifests in step 3, and uses the obtained cached manifests to construct the unique manifest for client device B 310-B.

In some embodiments, as represented by block 532, manifests in the cache are each for a predefined duration and shared by clients. For example, in FIG. 3A, upon generating the unique manifest for client device A 310-A for recording timeline that starts at 8:06 am and ends at 10:30 am, the playback engine 140 stores three 1-hour long manifest files in the cache 150 that started at 8 am, 9 am, and 10 am respectively. As shown in FIG. 3B, the cached manifest files may be reused by another request from client device B 310-B for recording timeline, e.g., 8:12 am to 10:30 am, that overlaps with the recording timeline requested by client device A 310-A (FIG. 3A). In other words, using the methods, devices, and systems described herein, manifest requests that have the same or overlapping times in their start and end time perform better without wasting resources for generating each unique manifest when they are mostly the same.

The method 500 continues, as represented by block 540, with the one or more servers, e.g., the playback engine 140 in FIG. 1A, appending the recording ID of the request to a URL prefix in the unique manifest. Further, as represented by block 542, in some embodiments, the URL prefix is used in segment requests by the client. As represented by block 550, the one or more servers then send the unique manifest to the client.

For example, as shown in FIG. 2, when constructing unique manifest 1 for client 1 requesting recording ID 1, the playback engine appends recording ID 1 to the value of the @BaseURL attribute. As a result of having recording ID 1 as part of the URL prefix, each of the subsequent segment requests from client 1 according to manifest 1 has recording ID 1 as part of the segment request URL.

Turning to FIG. 5B, in some embodiments, as represented by block 560, the method 500 further includes generating manifest data for recording data according to a global timeline, wherein the manifest data is chunked based on a predefined duration (e.g., 1-hour) along the global timeline, and storing the chunked manifest data according to the global timeline in an object store along with the recording data. For example, in FIG. 2, the common manifests 132 are stored along the global timeline and represent the duration and/or time period they are chunked to. During recording, the recording engine 120 (FIG. 1A) continuously appends the new manifest data it has received from the ingester and/or packager 110 (FIG. 1A) to the common manifests 132, which are stored in the object store 130 along with the object data as shown in FIG. 1B.

In such embodiments of using the global timeline for unique manifest generation, as represented by block 562, constructing the unique manifest in response to the request according to the recording timeline includes: (a) determining the recording timeline does not exist in the cache; (b) obtaining, from the object store, a set of the chunked manifest data covering the recording timeline; and (c) merging and trimming the set of the chunk manifest data according to the recording timeline in accordance with some embodiments. For example, as shown in FIG. 3A, the playback engine 140 determines that the recording timeline from 8:06 am to 10:30 am does not exist in the cache 150 and obtains the manifest data from the object store 130 in order to construct the unique manifest for client device A 310-A. When constructing the unique manifest, the playback engine 140 obtains the chunked manifest data in three 1-hour long manifest files representing the time periods starting at 8 am, 9 am, and 10 am respectively to cover the requested recording timeline. The playback engine 140 then merges such manifest files into one 3-hour long manifest file starting at 8 am and trims the 3-hour long manifest to start at 8:06 am and end at 10:30 am.

Also in such embodiments of using a global timeline for unique manifest generation, as represented by block 570, the method 500 further includes storing in the object store segment sequences representing the recording data according to the global timeline, and subscribing unique data corresponding to the recording ID to the segment sequences in accordance with some embodiments. For example, in FIG. 2, the segment sequences 1 through N, then N+1 through X, and X+1 through Y are recording data that are chronologically stored in the object store according to the global timeline as the recording engine 120 continuously records the encoded and/or packaged data from the ingester and/or packager 110. Further, as shown in FIGS. 1B and 4, the mappings 138 are maintained so that unique media and/or user data for each recording are mapped and/or subscribed to the segment sequences stored along the global timeline.

Still referring to FIG. 5B, in some embodiments, as represented by block 580, the method 500 further includes determining an end time derived from the recording timeline is after current time and has passed a minimum update time, obtaining, from an object store, updated manifest data for a current duration, merging the updated manifest data into the unique manifest, and storing the unique manifest in the cache for a predetermined duration. On the other hand, as represented by block 582, in some embodiments, obtaining at least the portion of the unique manifest from the cache includes determining the end time derived from the recording timeline is after the current time and the end time has not passed the minimum update time, and using a current hour manifest from the cache to construct the unique manifest.

For example, in step 2 shown in FIG. 3C, the playback engine 140 determines whether the current hour manifest is dynamic, e.g., the requested recording end time is after the current time indicating the storage system has not finished recording, the playback engine 140 checks the object store 130 for the current timeline in step 4 in case it has been updated. In some embodiments, to determine whether to check with the object store 130 for updates, the playback engine 140 checks whether the manifest in the cache has passed a minimum update time, e.g., a stale cached manifest for the current hour. Once the updated current hour manifest is obtained from the object store 130, as shown in FIG. 3C, the unique manifest, e.g., with start time at 11 am, is stored in the cache 150 to be shared with other clients for a predetermined duration. On the other hand, as shown in FIG. 3A, when the timeline is already in the cache 150, the playback engine 140 can use them without signaling to the object store 130 for updates. As such, for dynamic content, the system described herein improves efficiency by checking when the current hour manifest was last retrieved and not requesting a new one unless the minimum update time has passed.

Turning to FIG. 5C, in some embodiments, as represented by block 590, the method 500 further includes determining an end time derived from the recording timeline is not after current time and recording timeline does not exist in the cache, and storing the unique manifest in the cache to be shared with clients. For example, in FIG. 3A, in the case of the requested recording by client device A 310-A being static content, e.g., pre-recorded and/or VOD content, the playback engine 140 saves the manifests to the cache 150 for a short time to be shared with other clients, e.g., shared with client device B 310-B as shown in FIG. 3B.

In some embodiments, as represented by block 595, the method 500 further includes receiving, from the client, a segment request including the URL prefix and a segment ID specified in the unique manifest, extracting the recording ID from the URL prefix, and obtaining for the client the segment according to the recording ID and the segment ID. In such embodiments, as represented by block 597, obtaining for the client the segment according to the recording ID and the segment ID includes: (a) obtaining a unique portion of the segment according to the recording ID and the segment ID; (b) obtaining a common portion of the segment according to a source ID derived from the recording ID and the segment ID; and (c) merging the unique portion with the common portion to generate the segment in accordance with some embodiments.

For example, as shown in FIG. 2, each unique manifest returned to the client includes the recording ID appended to the URL specified in the value of the @BaseURL attribute. Accordingly, a subsequent segment request from the client has the recording ID as part of the request URL as shown in FIG. 4. Also as shown in FIG. 4, during playback time, the playback engine 140 receives such a segment request, obtains the recording ID from the request URL, and uses the recording ID in conjunction with the segment ID in the request to obtain the unique data, e.g., based on the recording ID and the segment ID, and the common data, e.g., based on the recording ID and the source ID derived from the recording ID. The unique data and the common data can then be merged to produce the segment to return to the client.

Figure 6:
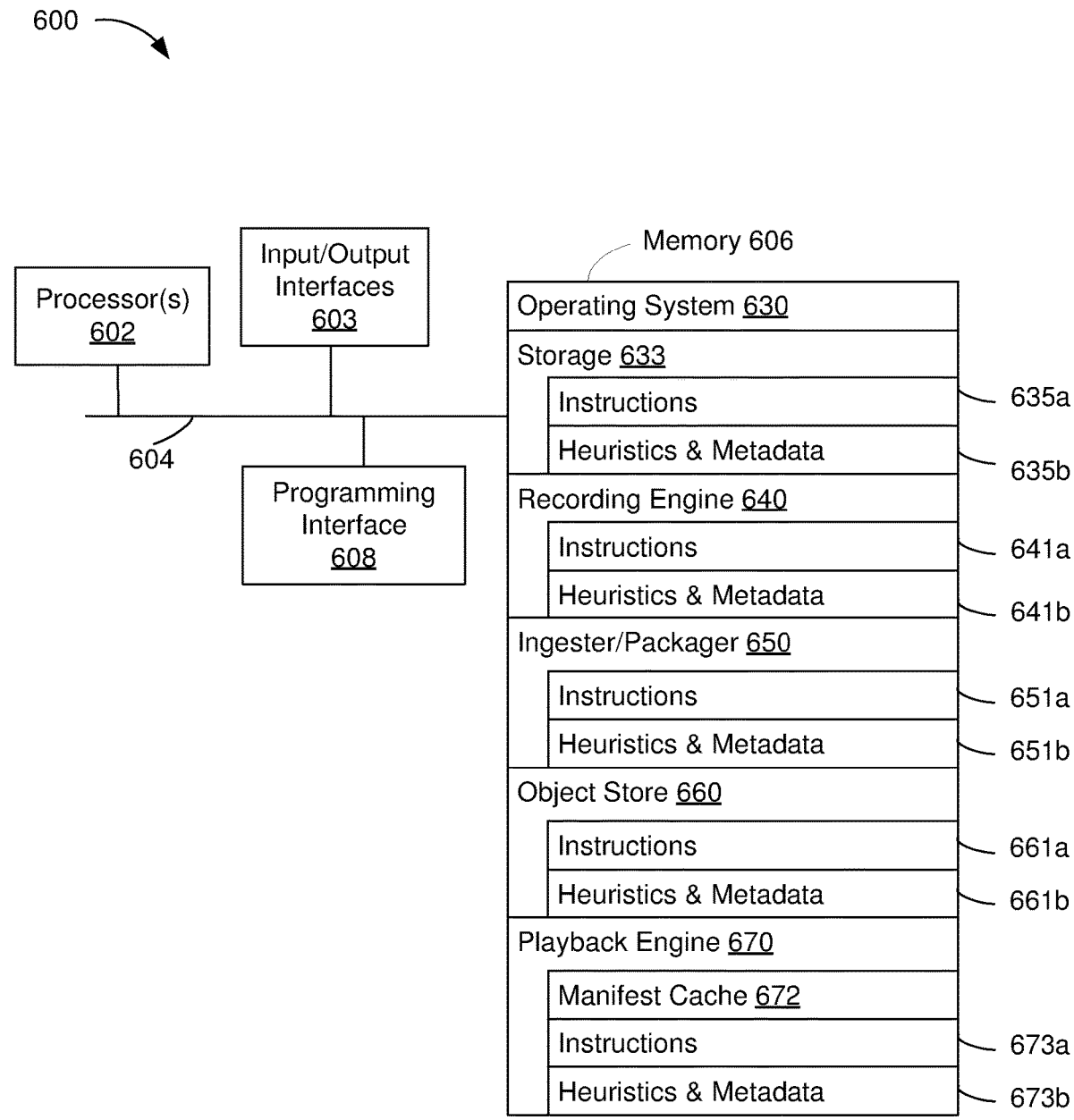
FIG. 6 is a block diagram of a computing device for generating unique manifests, in accordance with some embodiments.

FIG. 6 is a block diagram of a computing device 600 for generating unique manifests in accordance with some embodiments. In some embodiments, the computing device 600 performs one or more functions of one or more servers hosting the storage system 100A (FIG. 1A) and performs one or more of the functionalities described above with respect to the storage system 100A (FIG. 1A). While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments the computing device 600 includes one or more processing units 602 (e.g., CPU(s)), one or more input/output interfaces 603 (e.g., input devices, sensors, network interface(s), and/or a display, etc.), a memory 606, a programming interface 608, and one or more communication buses 604 for interconnecting these and various other components.

In some embodiments, the communication buses 604 include circuitry that interconnects and controls communications between system components. The memory 606 includes high-speed random access memory, such as DRAM, SRAM, DDR RAM or other random access solid state memory devices; and, in some embodiments, include non-volatile memory, such as one or more magnetic disk storage devices, optical disk storage devices, flash memory devices, or other non-volatile solid state storage devices. The memory 606 optionally includes one or more storage devices remotely located from the CPU(s) 602. The memory 606 comprises a non-transitory computer readable storage medium. Moreover, in some embodiments, the memory 606 or the non-transitory computer readable storage medium of the memory 606 stores the following programs, modules and data structures, or a subset thereof including an optional operating system 630, a storage module 633, a recording engine 640, an ingester and/or packager 650, an object store 660, and a playback engine 670. In some embodiments, one or more instructions are included in a combination of logic and non-transitory memory. The operating system 630 includes procedures for handling various basic system services and for performing hardware dependent tasks.

In some embodiments, the storage module 633 stores data related to the media content data and/or the corresponding metadata. To that end, the storage module 633 includes a set of instructions 635a and heuristics and metadata 635b.

In some embodiments, the recording engine 640 (e.g., the recording engine 120, FIG. 1A) is configured to record media content data as well as metadata associated with the media content data according to recording request(s), including generating the metadata describing common timelines to be stored in the object store 660. To that end, the recording engine 640 includes a set of instructions 641a and heuristics and metadata 641b.

In some embodiments, the ingester and/or packager 650 (e.g., the ingester/packager 110, FIG. 1A) is configured to ingest media content data and/or generate manifest data to be obtained by the recording engine 640 when packaging the ingested media content data. To that end, the ingester and/or packager 650 includes a set of instructions 651a and heuristics and metadata 651b.

In some embodiments, the object store 660 (e.g., the object store 130, FIGS. 1A and 1B) is configured to store media content data as well as metadata associated with the media content data received from the recording engine 640 and provides the media content data and the metadata as manifests to the playback engine 140 in response to playback requests. To that end, the object store 660 includes a set of instructions 661a and heuristics and metadata 661b.

In some embodiments, the playback engine 670 (e.g., the playback engine 140, FIG. 1A) is configured to obtain media objects from the object store 660 in response to playback request(s), e.g., each playback request associated with a recording ID and/or a requested recording timeline. In some embodiments, the playback engine 670 also includes a manifest cache 672 (e.g., the cache 150, FIG. 1A) for storing unique manifests that have been requested by clients. To that end, the playback engine 670 includes a set of instructions 673a and heuristics and metadata 673b.

Although the storage module 633, the recording engine 640, the ingester and/or packager 650, the object store 660, and the playback engine 670 are illustrated as residing on a single computing device 600, it should be understood that in other embodiments, any combination of the storage module 633, the recording engine 640, the ingester and/or packager 650, the object store 660, and the playback engine 670 can reside on separate computing devices. For example, in some embodiments, each of the storage module 633, the recording engine 640, the ingester and/or packager 650, the object store 660, and the playback engine 670 resides on a separate computing device (e.g., a separate server).

Moreover, FIG. 6 is intended more as functional description of the various features which are present in a particular implementation as opposed to a structural schematic of the embodiments described herein. As recognized by those of ordinary skill in the art, items shown separately could be combined and some items could be separated. For example, some functional modules shown separately in FIG. 6 could be implemented in a single module and the various functions of single functional blocks could be implemented by one or more functional blocks in various embodiments. The actual number of modules and the division of particular functions and how features are allocated among them will vary from one embodiment to another, and may depend in part on the particular combination of hardware, software and/or firmware chosen for a particular embodiment.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first device could be termed a second device, and, similarly, a second device could be termed a first device, which changing the meaning of the description, so long as all occurrences of the "first device" are renamed consistently and all occurrences of the "second device" are renamed consistently. The first device and the second device are both devices, but they are not the same device.

The terminology used herein is for the purpose of describing particular embodiments only and is not intended to be limiting of the claims. As used in the description of the embodiments and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting", that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
at one or more servers including one or more processors, one or more non-transitory memory, and one or more network interfaces perform:
generating manifest data in an object store while recording data for a plurality of clients, wherein the object store stores the manifest data corresponding to the recorded data in different common manifest files corresponding to predefined durations without tracking a plurality of recording identifiers (IDs) for the plurality of clients in the different common manifest files;
generating and storing manifest files in a cache outside an object store in response to receiving playback requests from the plurality of clients, wherein the manifest files are shared by the plurality of clients, and the manifest files are stored in the cache according to the predefined durations along recording timelines, including:
receiving a request from a client for a unique manifest, wherein the request indicates a recording timeline and includes a recording;
determining whether a corresponding portion of the recording timeline exists in the cache;
in accordance with determining that the corresponding portion of the recording timeline exists in the cache, obtaining from the cache one or more manifest files according to the corresponding portion of the recording timeline and constructing at least a portion of the unique manifest using the one or more manifest files;
in accordance with determining that the corresponding portion of the recording timeline does not exist in the cache, obtaining from the object store a set of the different common manifest files corresponding to the recording timeline and constructing at least the portion of the unique manifest using the set of the different common manifest files;
modifying the unique manifest by appending the recording ID of the request to a URL prefix in the unique manifest;
storing the unique manifest in the cache according to the predefined duration along the recording timeline; and
sending the unique manifest to the client.

2. The method of claim 1, wherein the recording ID includes a source ID of a source and a respective global timeline is constructed for segment sequences recorded from the source.

3. The method of claim 1, wherein the manifest files in the cache are each for a predefined duration and shared by the plurality of clients.

4. The method of claim 1, wherein the URL prefix is used in segment requests by the client.

5. The method of claim 1, further comprising:
generating the manifest data for the recording data according to a global timeline, wherein the manifest data is chunked based on a predefined duration along the global timeline; and
storing the chunked manifest data as the different common manifest files according to the global timeline in the object store along with the recording data.

6. The method of claim 1, wherein in accordance with determining that the corresponding portion of the recording timeline does not exist in the cache, obtaining from the object store the set of the different common manifest files corresponding to the recording timeline and constructing at least the portion of the unique manifest using the one or more manifest files includes:
obtaining, from the object store, the set of the different common manifest files covering the recording timeline; and
merging and trimming the set of the different common manifest files according to the recording timeline.

7. The method of claim 1, further comprising:
storing in the object store segment sequences representing the recording data according to a global timeline; and
subscribing unique data corresponding to the recording ID to the segment sequences.

8. The method of claim 1, further comprising:
determining an end time derived from the recording timeline is after current time and has passed a minimum update time;
obtaining, from the object store, updated manifest data for a current duration;
merging the updated manifest data into the unique manifest; and
storing the unique manifest in the cache for a predetermined duration.

9. The method of claim 8, wherein obtaining at least the portion of the unique manifest from the cache includes:
determining the end time derived from the recording timeline is after the current time and the end time has not passed the minimum update time; and
using a current hour manifest from the cache to construct the unique manifest.

10. The method of claim 1, further comprising: determining an end time derived from the recording timeline is not after current time and the recording timeline does not exist in the cache; and
storing the unique manifest in the cache to be shared with the plurality of clients.

11. The method of claim 1, further comprising: receiving, from the client, a segment request including the URL prefix and a segment ID specified in the unique manifest;

extracting the recording ID from the URL prefix; and
obtaining for the client a segment according to the recording ID and the segment ID.

12. The method of claim 11, wherein obtaining for the client the segment according to the recording ID and the segment ID includes:
obtaining a unique portion of the segment according to the recording ID and the segment ID;
obtaining a common portion of the segment according to a source ID derived from the recording ID and the segment ID; and
merging the unique portion with the common portion to generate the segment.

13. A non-transitory memory storing one or more programs, which, when executed by one or more processors of one or more servers with one or more network interfaces, cause the one or more servers to:
generate manifest data in an object store while recording data for a plurality of clients, wherein the object store stores the manifest data corresponding to the recorded data in different common manifest files corresponding to predefined durations without tracking a plurality of recording identifiers (IDs) for the plurality of clients in the different common manifest files;
generate and store manifest files in a cache outside an object store in response to receiving playback requests from the plurality of clients, wherein the manifest files are shared by the plurality of clients, and the manifest files are stored in the cache according to the predefined durations along recording timelines, including:
receiving a request from a client for a unique manifest, wherein the request indicates a recording timeline and includes a recording ID;
determining whether a corresponding portion of the recording timeline exists in the cache;
in accordance with determining that the corresponding portion of the recording timeline exists in the cache, obtaining from the cache one or more manifest files according to the corresponding portion of the recording timeline and constructing at least a portion of the unique manifest using the one or more manifest files,
in accordance with determining that the corresponding portion of the recording timeline does not exist in the cache, obtaining from the object store a set of the different common manifest files corresponding to the recording timeline and constructing at least the portion of the unique manifest using the set of the different common manifest files;
modifying the unique manifest by appending the recording ID of the request to a URL prefix in the unique manifest; and
storing the unique manifest in the cache according to the predefined duration along the recording timeline; and
send the unique manifest to the client.

14. The non-transitory memory of claim 13, wherein the recording ID includes a source ID of a source and a respective global timeline is constructed for segment sequences recorded from the source.

15. The non-transitory memory of claim 13, wherein the manifest files in the cache are each for a predefined duration and shared by the plurality of clients.

16. The non-transitory memory of claim 13, wherein the URL prefix is used in segment requests by the client.

17. The non-transitory memory of claim 13, wherein the one or more programs, which, when executed by the one or more processors, further cause the one or more servers to:
generate the manifest data for recording data according to a global timeline, wherein the manifest data is chunked based on a predefined duration along the global timeline; and
store the chunked manifest data as the different common manifest files according to the global timeline in the object store along with the recording data.

18. The non-transitory memory of claim 13, wherein in accordance with determining that the corresponding portion of the recording timeline does not exist in the cache,
obtaining from the object store the set of the different common manifest files corresponding to the recording timeline and constructing at least the portion of the unique manifest using the one or more manifest files includes:
obtaining, from the object store, the set of the different common manifest files covering the recording timeline; and
merging and trimming the set of the different common manifest files according to the recording timeline.

19. The non-transitory memory of claim 13, wherein the one or more programs, which, when executed by the one or more processors, further cause the one or more servers to:
store in the object store segment sequences representing the recording data according to a global timeline; and
subscribe unique data corresponding to the recording ID to the segment sequences.

20. A device comprising:
one or more processors;
one or more non-transitory memory; one or more network interfaces; and
one or more programs, stored in the one or more non-transitory memory, which, when executed by the one or more processors, cause the device to:
generate manifest data in an object store while recording data for a plurality of clients, wherein the object store stores the manifest data corresponding to the recorded data in different common manifest files corresponding to predefined durations without tracking a plurality of recording identifiers (IDs) for the plurality of clients in the different common manifest files;
generate and store manifest files in a cache outside an object store in response to receiving playback requests from the plurality of clients, wherein the manifest files are shared by the plurality of clients, and the manifest files are stored in the cache according to the predefined durations along recording timelines, including:
receiving a request from a client for a unique manifest, wherein the request indicates a recording timeline and includes a recording ID;
determining whether a corresponding portion of the recording timeline exists in the cache;
in accordance with determining that the corresponding portion of the recording timeline exists in the cache, obtaining from the cache one or more manifest files according to the corresponding portion of the recording timeline and constructing at least a portion of the unique manifest using the one or more manifest files,
in accordance with determining that the corresponding portion of the recording timeline does not exist in the cache, obtaining from the object store a set of the different common manifest files corresponding to the recording timeline and constructing at least the portion of the unique manifest using the set of the different common manifest files;

modifying the unique manifest by appending the recording ID of the request to a URL prefix in the unique manifest; and storing the unique manifest in the cache according to the predefined duration along the recording timeline; and send the unique manifest to the client.

\* \* \* \* \*